US011543935B2

(12) United States Patent
Sun

(10) Patent No.: US 11,543,935 B2
(45) Date of Patent: Jan. 3, 2023

(54) INFORMATION PROCESSING METHOD AND TERMINAL DEVICE

(71) Applicant: VIVO MOBILE COMMUNICATION CO., LTD., Guangdong (CN)

(72) Inventor: Chengrui Sun, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/388,680

(22) Filed: Jul. 29, 2021

(65) Prior Publication Data

US 2021/0357106 A1    Nov. 18, 2021

Related U.S. Application Data

(63) Continuation of application No. PCT/CN2020/071729, filed on Jan. 13, 2020.

(30) Foreign Application Priority Data

Jan. 31, 2019  (CN) .......................... 201910098971.7

(51) Int. Cl.
*G06F 3/048* (2013.01)
*G06F 3/04817* (2022.01)
(Continued)

(52) U.S. Cl.
CPC ........ *G06F 3/04817* (2013.01); *G06F 3/0482* (2013.01); *G06F 9/451* (2018.02); *G06F 3/04883* (2013.01)

(58) Field of Classification Search
CPC .. G06F 3/0481; G06F 3/04817; G06F 3/0482; G06F 3/04883; G06F 9/451
See application file for complete search history.

(56) References Cited

U.S. PATENT DOCUMENTS

2013/0321340 A1* 12/2013 Seo ..................... G06F 3/04883
                                                    345/174
2015/0082201 A1*  3/2015 Sung ...................... H04L 51/04
                                                    715/753
(Continued)

FOREIGN PATENT DOCUMENTS

CN        102654814 A      9/2012
CN        106155472 A     11/2016
(Continued)

OTHER PUBLICATIONS

International Search Report and Written Opinion of the International Searching Authority regarding International Patent Application No. PCT/CN2020/071729, dated Apr. 16, 2020. Translation provided by Bohui Intellectual Property.
(Continued)

*Primary Examiner* — Thanh T Vu
(74) *Attorney, Agent, or Firm* — Harness, Dickey & Pierce, P.L.C.

(57) ABSTRACT

An information processing method includes: in cases where at least one application program icon is displayed in a first display area, and an interface of a first application program is displayed in a second display area, receiving an input by a user for an icon of a second application program among the at least one application program icon; and in response to the input, performing a target operation in the second display area based on a display feature of the first application program. The at least one application program icon includes the icon of the second application program. The target operation is associated with the second application program.

12 Claims, 12 Drawing Sheets

(51) Int. Cl.
G06F 9/451 (2018.01)
G06F 3/0482 (2013.01)
G06F 3/04883 (2022.01)

(56) References Cited

U.S. PATENT DOCUMENTS

2016/0117665 A1* 4/2016 Davis .................. G06Q 20/386
                                                      705/39
2016/0202889 A1* 7/2016 Shin ..................... G06F 3/0482
                                                      715/758
2016/0342308 A1   11/2016 Aggarwal

FOREIGN PATENT DOCUMENTS

| CN | 107636595 A | 1/2018 |
| CN | 107943359 A | 4/2018 |
| CN | 107992244 A | 5/2018 |
| CN | 108446058 A | 8/2018 |
| CN | 108491125 A | 9/2018 |
| CN | 108509105 A | 9/2018 |
| CN | 109284146 A | 1/2019 |
| CN | 109857297 A | 6/2019 |

OTHER PUBLICATIONS

First Office Action regarding Chinese Patent Application No. 201910098971.7, dated May 6, 2020. Translation provided by Bohui Intellectual Property.

Notification to Grant Patent Right for Invention regarding Chinese Patent Application No. 201910098971.7, dated Jul. 27, 2020. Translation provided by Bohui Intellectual Property.

* cited by examiner

INFORMATION PROCESSING METHOD AND TERMINAL DEVICE

CROSS-REFERENCE TO RELATED APPLICATIONS

This application is a Bypass Continuation Application of PCT/CN2020/071729 filed on Jan. 13, 2020, which claims priority to Chinese Patent Application No. 201910098971.7 filed on Jan. 31, 2019, which are incorporated herein by reference in their entirety.

TECHNICAL FIELD

The present disclosure relates to the field of communications technologies, and in particular, to an information processing method and a terminal device.

BACKGROUND

With the development of a terminal device, the terminal device has increasingly more functions, greatly facilitating people's life. As people's pace of life accelerates, a convenient operation manner is an important indicator of improving user approval for the terminal device.

When a user performs some conventional operations by using an application program, for example, upgrading the application program or setting a permission of the application program, multiple operations generally need to be performed in an interface of the application program to search for a required function. Setting the permission of the application program is used as an example. When permissions of multiple application programs need to be separately set, multiple operations need to be performed on each application program one by one to enter a permission setting interface of the application program. This operation manner is tedious.

SUMMARY

Embodiments of the present disclosure provide an information processing method and a terminal device.

According to a first aspect, an embodiment of the present disclosure provides an information processing method, applied to a terminal device including a first display area and a second display area, and including:
  in a case where at least one application program icon is displayed in the first display area, and an interface of a first application program is displayed in the second display area, receiving an input by a user for an icon of a second application program, where the at least one application program icon includes the icon of the second application program; and
  in response to the input, performing a target operation in the second display area based on a display feature of the first application program, where the target operation is associated with the second application program.

According to a second aspect, an embodiment of the present disclosure further provides a terminal device, where the terminal device includes a first display area and a second display area, and includes:
  a receiving module, configured to: in a case where at least one application program icon is displayed in the first display area, and an interface of a first application program is displayed in the second display area, receive an input by a user for an icon of a second application program, where the at least one application program icon includes the icon of the second application program; and
  an execution module, configured to: in response to the input, perform a target operation in the second display area based on a display feature of the first application program, where the target operation is associated with the second application program.

According to a third aspect, an embodiment of the present disclosure further provides a terminal device, including a memory, a processor, and a computer program that is stored in the memory and executable on the processor, where when the computer program is executed by the processor, steps in the foregoing information processing method are implemented.

According to a fourth aspect, an embodiment of the present disclosure further provides a non-transitory computer-readable storage medium, where the non-transitory computer-readable storage medium stores a computer program, and when the computer program is executed by a processor, steps in the foregoing information processing method are implemented.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other accompanying drawings from these accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art shall fall within the protection scope of the present disclosure.

Figure 1:
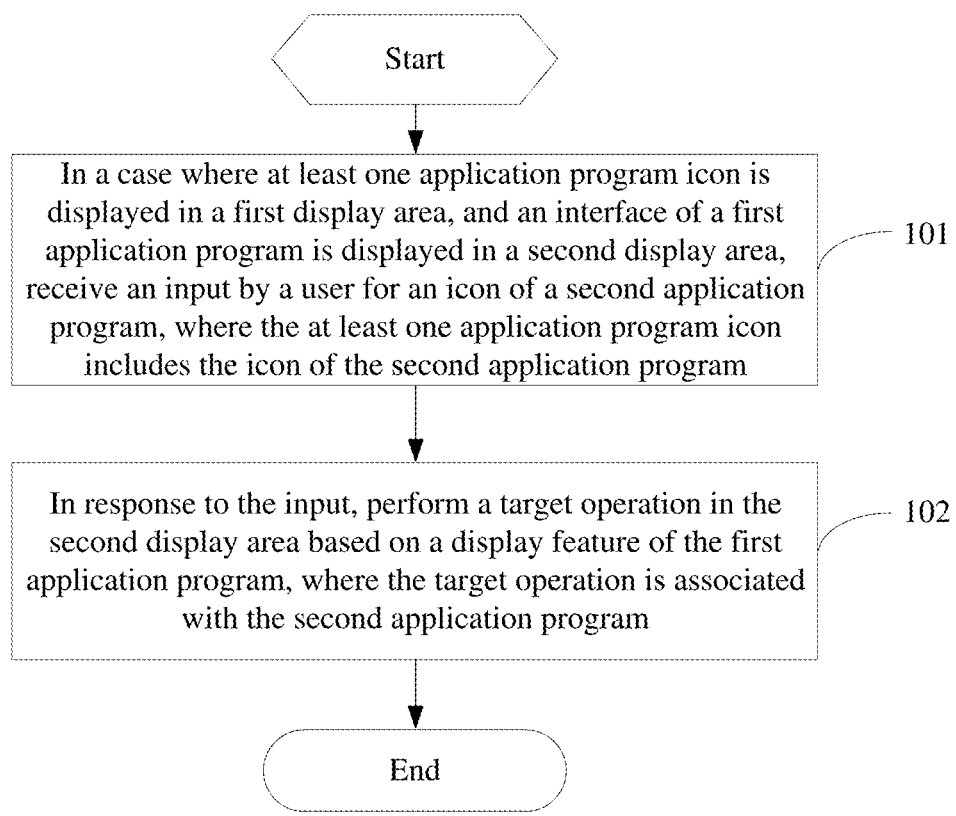
FIG. 1 is a flowchart 1 of an information processing method according to an embodiment of the present disclosure.

FIG. 1 is a flowchart of an information processing method according to an embodiment of the present disclosure. As shown in FIG. 1, the method includes the following steps:

Step 101: In a case where at least one application program icon is displayed in a first display area, and an interface of a first application program is displayed in a second display area, receive an input by a user for an icon of a second application program, where the at least one application program icon includes the icon of the second application program.

The terminal device may include the first display area and the second display area. The two display areas may be any two display areas on a display screen of the terminal device, for example, two display areas formed by folding a display screen by a specific angle, or two display areas obtained after a screen is split for display, or may be two display areas corresponding to two display screens connected by a rotating shaft.

The at least one application program icon is displayed in the first display area. The application program icon may be a desktop icon, may be an application program icon in another interface, or may be an icon of a sub-application program in an application program. The interface of the first application program is displayed in the second display area. The interface may be any interface of the first application program, for example, a conversation interface of a social application program, or an interface of a settings application program.

The at least one application program icon includes the icon of the second application program, and the user may perform input for the icon of the second application program, for example, a drag operation, a slide operation, or a press operation.

Step 102: In response to the input, perform a target operation in the second display area based on a display feature of the first application program, where the target operation is associated with the second application program.

In this step, the terminal device obtains the display feature of the first application program, for example, display content in an interface or a feature of an interface, and performs the target operation in the second display area. The target operation may be an operation corresponding to the display feature of the first application program.

An association relationship between the target operation and the first application program and the second application program may be preset by the terminal device, or may be preset based on a user operation.

For example, in a case where a conversation interface of a social application program is displayed in the second display area, content associated with the second application program may be sent by using the conversation interface, for example, a notification message or a download link address of the second application program.

For another example, in a case where a browser application program is displayed in the second display area, in this step, messages or information related to the second application program may be searched for.

In this way, the user may perform input for the second application program in the first display area based on the displayed first application program, to perform the target operation, so that operation efficiency of the user can be improved.

In this embodiment of the present disclosure, the information processing method may be applied to a terminal device, such as a mobile phone, a tablet personal computer, a laptop computer, a personal digital assistant (PDA), a mobile Internet device (MID), or a wearable device.

In the information processing method in this embodiment of the present disclosure, in a case where at least one application program icon is displayed in a first display area, and an interface of a first application program is displayed in a second display area, an input by a user for an icon of a second application program, where the at least one application program icon includes the icon of the second application program, is received; and in response to the input, a target operation is performed in the second display area based on a display feature of the first application program, where the target operation is associated with the second application program. In this way, the user can perform an operation based on an application program icon and a displayed interface of an application program, so that user operations can be reduced, operation efficiency can be improved, and convenience of a triggering manner between application programs is improved. For the user, in a case where a triggering function in an application program process is used, operation costs are reduced, an operation manner is convenient, and user experience is improved. For the terminal device, enjoyment is increased.

Figure 2:
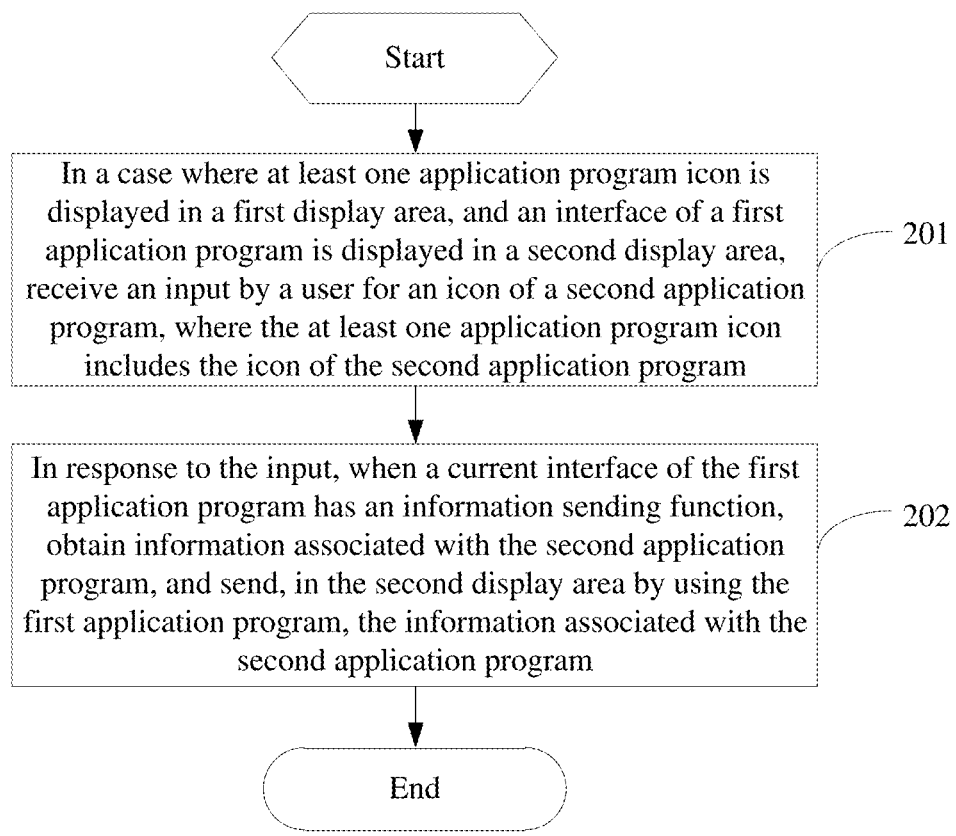
FIG. 2 is a flowchart 2 of an information processing method according to an embodiment of the present disclosure.

Referring to FIG. 2, a main difference between this embodiment and the foregoing embodiment lies in how to perform a specific operation in a second display area based on a display feature of a first application program.

FIG. 2 is a flowchart of an information processing method according to an embodiment of the present disclosure. As shown in FIG. 2, the method includes the following steps:

Step 201: In a case where at least one application program icon is displayed in a first display area, and an interface of a first application program is displayed in a second display area, receive an input by a user for an icon of a second application program, where the at least one application program icon includes the icon of the second application program.

For a specific implementation of this step, reference may be made to the descriptions in the foregoing embodiment.

Step 202: In response to the input, in a case where a current interface of the first application program has an information sending function, obtain information associated with the second application program, and send, in the second display area by using the first application program, the information associated with the second application program.

The current interface may be an interface that is being displayed by the terminal device.

In this step, the terminal device may obtain an interface feature of the first application program, and determine whether the current interface has the information sending function. The sending function includes a function of sending information to another user or sending information to a server. If the interface of the first application program has the information sending function, the information associated with the second application program may be sent by using the first application program. In this way, information can be quickly sent by using the first application program.

The information associated with the second application program is, for example, a download link or a received notification message of the second application program, and the information may be obtained from locally stored information, or may be obtained by searching another application program.

The terminal device may send, by using the interface of the first application program, the information associated with the second application program.

In order to understand this implementation easily, a specific embodiment is used as an example below for description.

Figure 3:
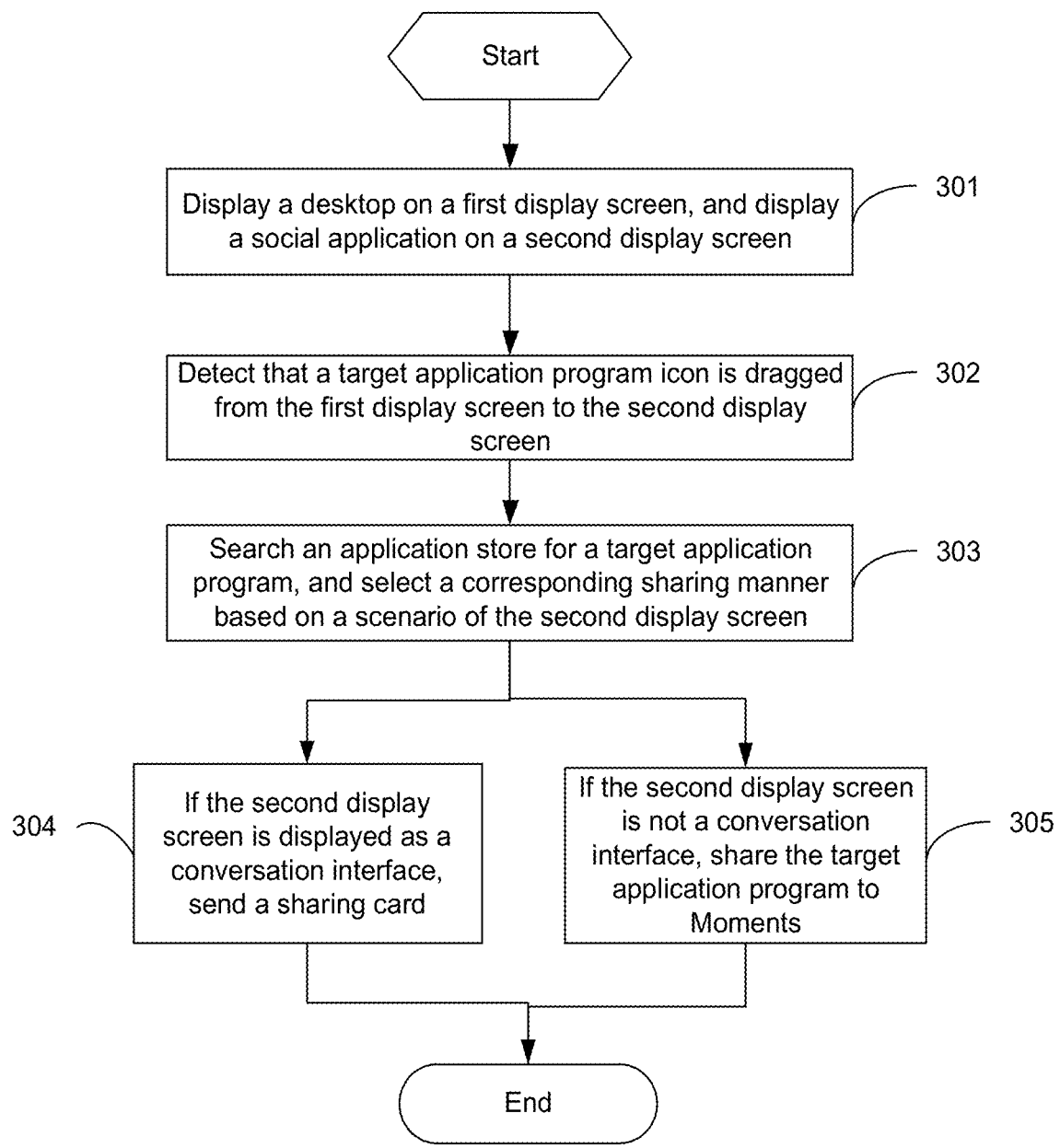
FIG. 3 is a flowchart 3 of an information processing method according to an embodiment of the present disclosure.

For example, as shown in FIG. 3, the information processing method may include the following steps:

Step 301: A terminal device displays a desktop on a first display screen, and displays a social application on a second display screen.

Figure 4:
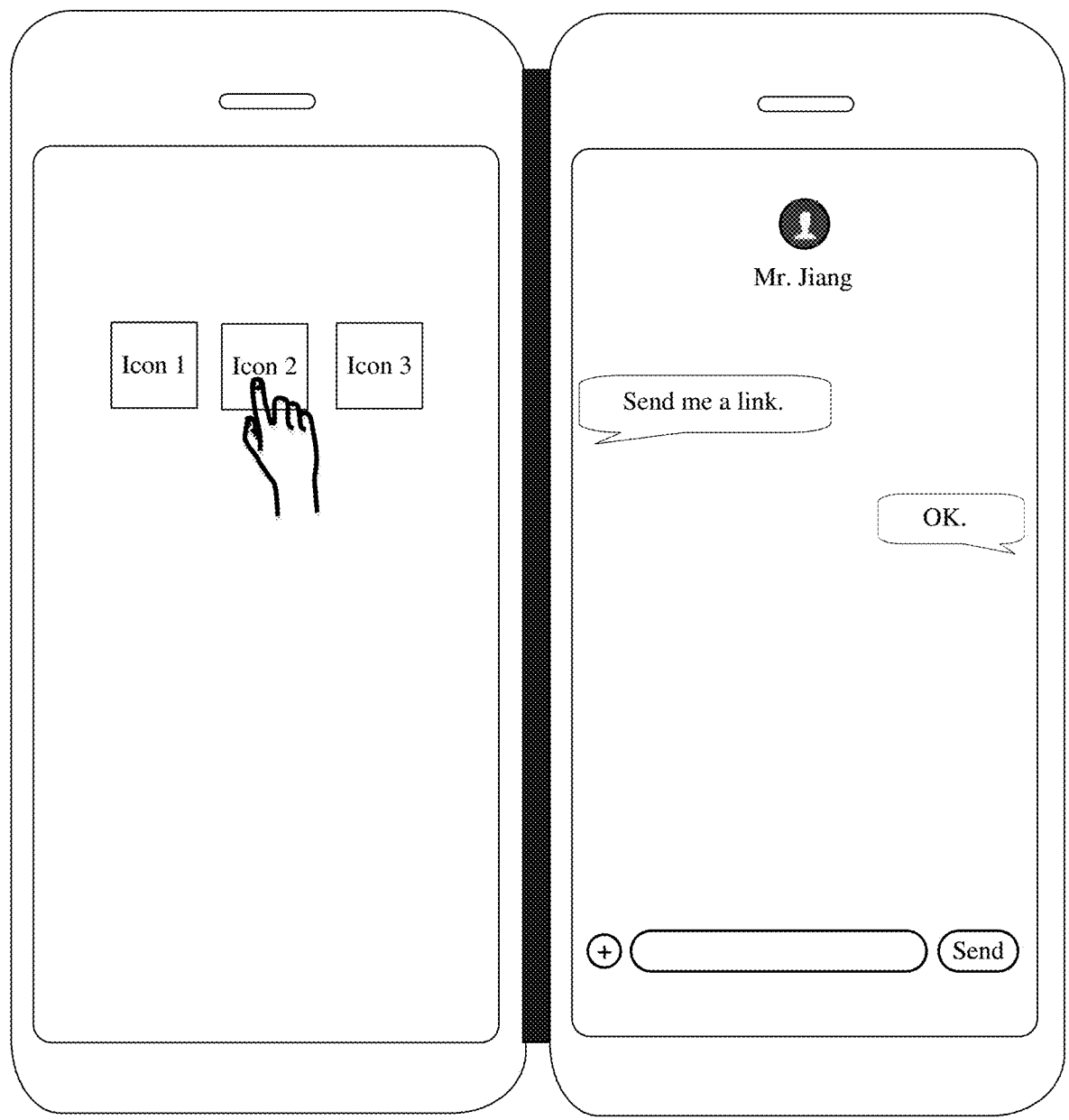
FIG. 4 is a schematic diagram 1 of an interface of a terminal device according to an embodiment of the present disclosure.

For this step, reference may be made to an interface shown in FIG. 4.

Step 302: Detect that a user drags a target application program icon from the first display screen to the second display screen.

The target application program icon may be icon 2 shown in FIG. 4.

Step 303: The terminal device searches an application store for a target application program, and selects a corresponding sharing manner based on a scenario of the second display screen.

This step may include step 304 and step 305. The terminal device may search the application store for the target application program to obtain a download link of the target application program. If the target application program is not found in the application store, the terminal device outputs prompt information.

Step 304: If the second display screen is displayed as a conversation interface shown in FIG. 4, send a sharing card by using a conversation box, in other words, send a download address link of the target application program.

Step 305: If a display interface of the second display screen is not a conversation interface, share a download link of the target application program through Moments, community, or the like.

In this implementation, the user may quickly share information about the second application program by using the first application program, so that user operations can be reduced.

The foregoing step 202 may be alternatively replaced with step 203.

Step 203: In response to the input, in a case where a current interface of the first application program has an information update function, obtain update information of the second application program, and update the second application program in the second display area by using the update information.

The information update function may be a function for updating information about an application program. In this step, the terminal device may obtain the update information of the second application program by searching an application store or by performing searching locally, and update the second application program by using the update information.

When the update information cannot be obtained, prompt information may be output, and the second application program is not updated.

Figure 5:
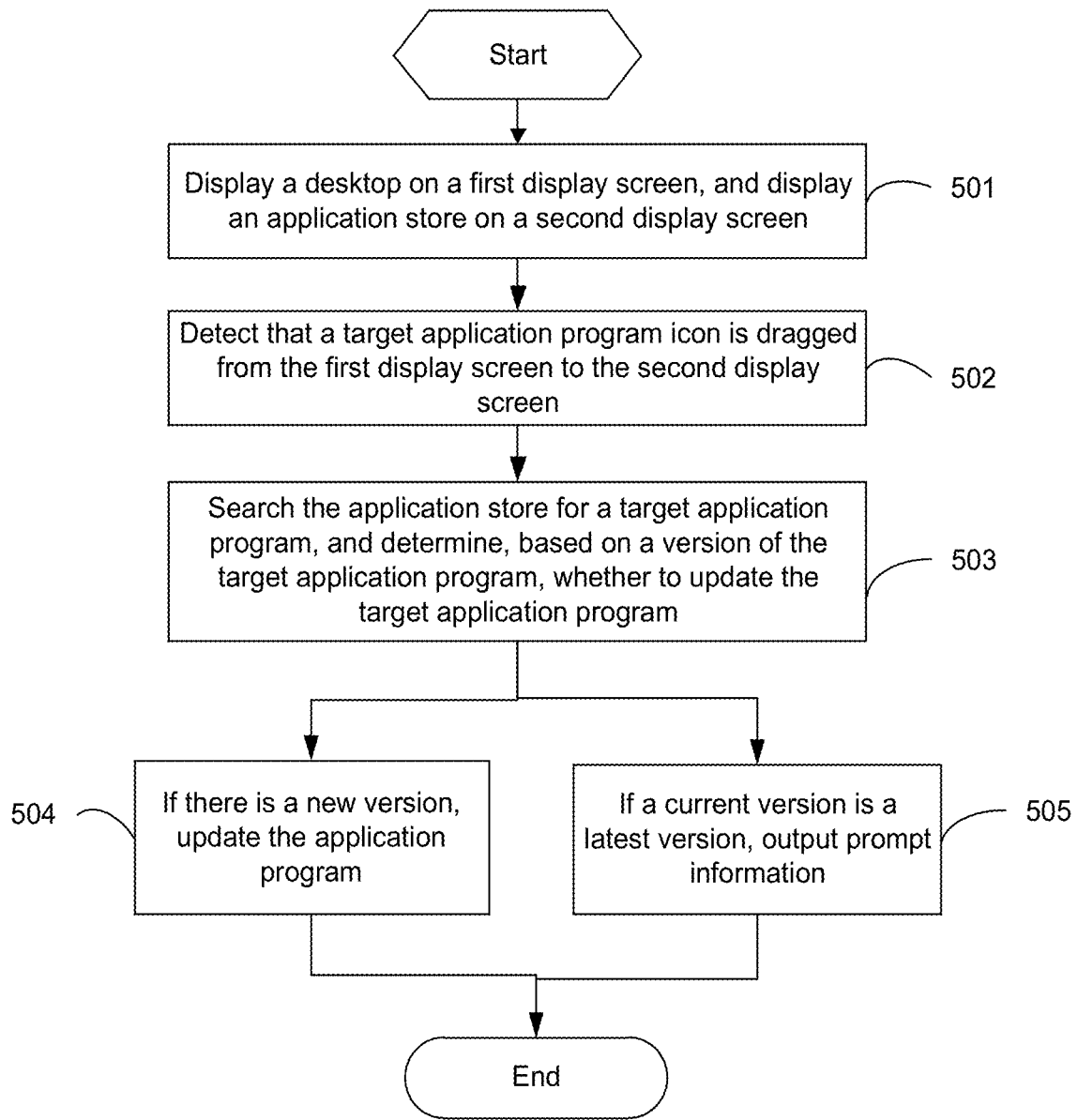
FIG. 5 is a flowchart 4 of an information processing method according to an embodiment of the present disclosure.

A specific implementation of this implementation scenario may be shown in FIG. 5 and includes the following steps:

Step 501: Display a desktop on a first display screen, and display an application store on a second display screen.

Figure 6:
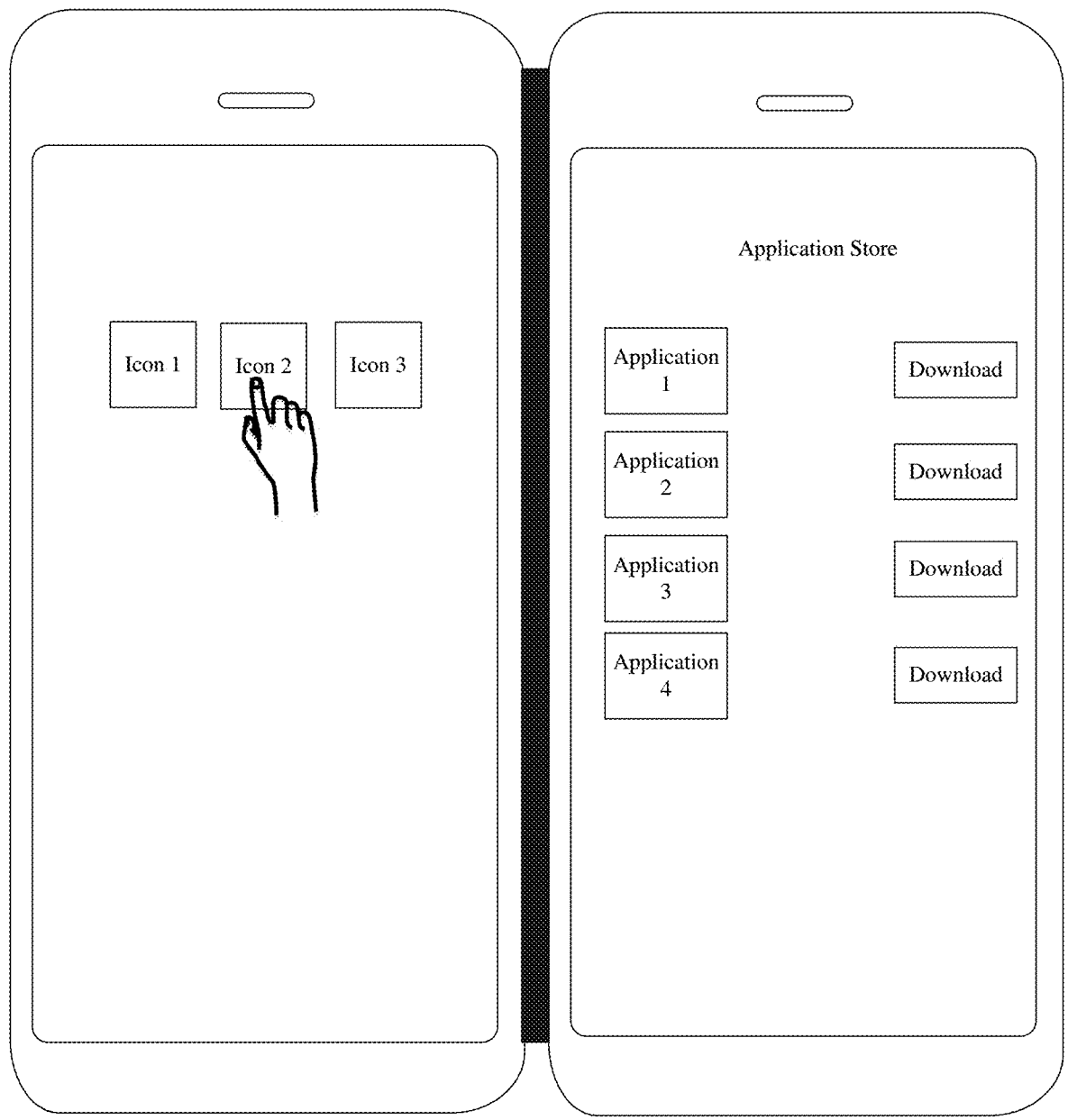
FIG. 6 is a schematic diagram 2 of an interface of a terminal device according to an embodiment of the present disclosure.

For this step, reference may be made to an interface shown in FIG. 6.

Step 502: Detect that a user drags a target application program icon from the first display screen to the second display screen.

The target application program icon may be icon 2 shown in FIG. 6.

Step 503: The terminal device searches the application store for a target application program, and determines, based on a version of the target application program, whether to update the target application program.

Step 504: If an updated version is found, obtain updated information and update the target application program.

For example, as shown in FIG. 6, if it is found in the application store that an application program 2 corresponding to the icon 2 has an updated version, updated content of the application program 2 will be downloaded, and the application program 2 will be updated.

Step 505: If the version of the target application program is a latest version, output prompt information.

The prompt information is, for example, that a current version is the latest version.

In this way, the user can quickly update an application program. When multiple application programs need to be updated, update efficiency can be improved.

The foregoing step 202 may be alternatively replaced with step 204.

Step 204: In response to the input, in a case where a current interface of the first application program has an information setting function, set the second application program in the second display area.

A setting function may be a function for setting a permission, a display manner, whether to enable positioning, or the like for an application program, and the first application program may be a settings application program. In this step, the terminal device may set the second application program on a second display screen by using the first application program.

Figure 7:
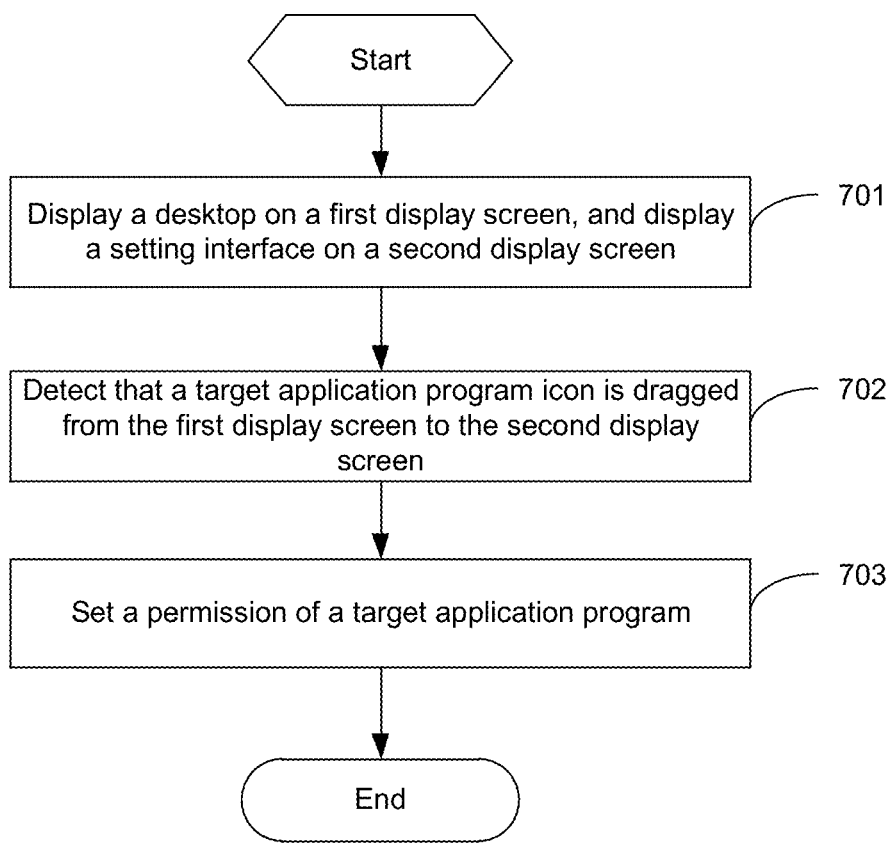
FIG. 7 is a flowchart 5 of an information processing method according to an embodiment of the present disclosure.

For an application scenario of this embodiment, reference may be made to FIG. 7. The following steps are included:

Step 701: The terminal device displays a desktop on a first display screen, and displays a setting interface on a second display screen.

Figure 8:
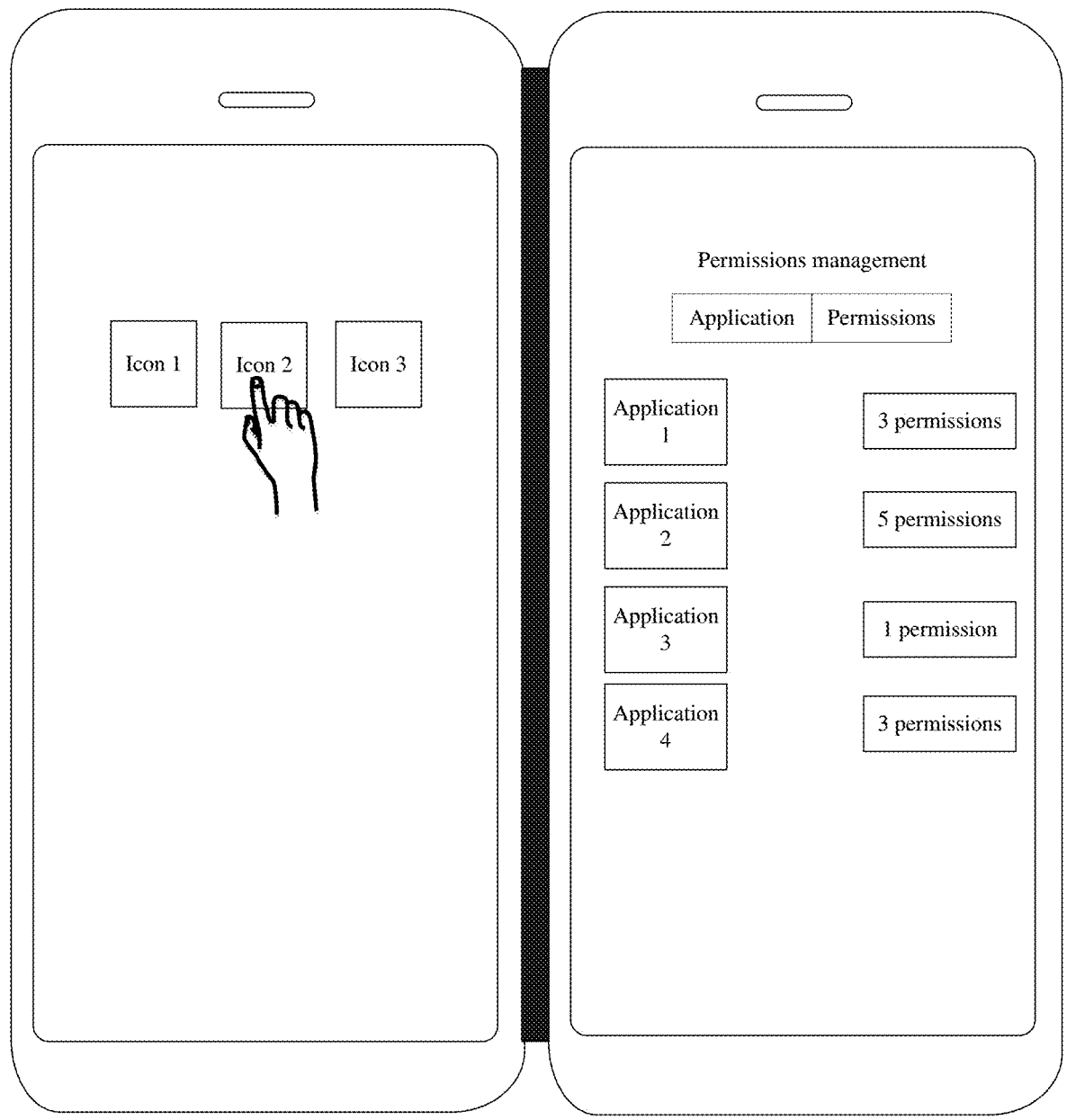
FIG. 8 is a schematic diagram 3 of an interface of a terminal device according to an embodiment of the present disclosure.

For this step, reference may be made to an interface shown in FIG. 8. The settings application program is displayed on the second display screen.

Step 702: Detect that a user drags a target application program icon from the first display screen to the second display screen.

The target application program icon may be icon 2 shown in FIG. 8.

Step 703: Set a permission of the target application program on the second display screen.

In this step, the setting, by using a permission setting application program displayed on the second display screen, a permission of the target application program includes whether to enable positioning, whether to read contact information, whether to read an album, and the like.

In this implementation, a permission of an application program can be quickly set, so that user operations can be reduced and operation efficiency can be improved.

Optionally, the interface of the first application program includes at least a target control corresponding to a target function, an operation track corresponding to the input includes an operation start point and an operation end point, the operation start point is located in a first preset area in which the icon of the second application program is located, and the operation end point is located in a second preset area in which the target control is located.

The performing a target operation in the second display area based on a display feature of the first application program includes:

performing, in the second display area, a target operation corresponding to the target function.

In this implementation, the interface of the first application program may include the target control, and the user operates the target control, to control the terminal device to implement the target function. The input may be used to select the first application program or the second application program, and the input may be drag input, slide input, or the like.

If the operation start point of the operation track corresponding to the input is located in the first preset area in which the icon of the second application program is located, and the operation end point is located in the second preset area in which the target control is located, the target operation corresponding to the target function is performed in the second display area. In this way, if the interface of the first application program includes multiple controls, the target control may be selected according to an actual situation, to implement the target function corresponding to the target control, so that operation flexibility can be improved and user operations are facilitated. The preset area in which the icon is located may be an area that is preset by the terminal device and that includes a location at which the icon is located.

This embodiment may also be applied to the embodiment corresponding to FIG. 1, and a same beneficial effect is achieved.

Optionally, before the performing a target operation in the second display area based on a display feature of the first application program, the method further includes:

identifying a type of the second application program; and
 the performing a target operation in the second display area based on a display feature of the first application program includes:
 performing the target operation in the second display area based on the display feature of the first application program, where the target operation is associated with the type of the second application program.

The type of the second application program may be understood as a type of a main function that the second application program is used to implement, for example, a news type, a payment type, a map type, and a photographing type. The terminal device performs, based on the type of the second application program, an operation that is of the first application program and that is associated with the type.

For example, if the type of the second application program is a photographing type, a photographing function is enabled in the first application program; if the type of the second application program is a payment type, an operation of sending a red packet is performed in the first application program; and if the type of the second application program is a news type, news information is displayed in the first application program.

An association relationship between the type of the second application program and the target operation may be preset by the terminal, or may be set by receiving a user operation.

In this way, it is convenient for the user to quickly enable a required function in the first application program, and user operations can be reduced.

Optionally, the second application program is a payment-type application program, and the performing a target operation in the second display area based on a display feature of the first application program includes:

in a case where a display interface of the first application program is a conversation interface, performing, in the second display area, an operation corresponding to a payment function.

The payment-type application program may be an application program with a payment function. In this implementation, if the interface of the first application program is a conversation interface, the operation corresponding to the payment function is performed on the second display screen, for example, a payment interface is displayed on the second display screen.

In order to understand this implementation easily, a specific embodiment is used as an example below for description.

Figure 9:
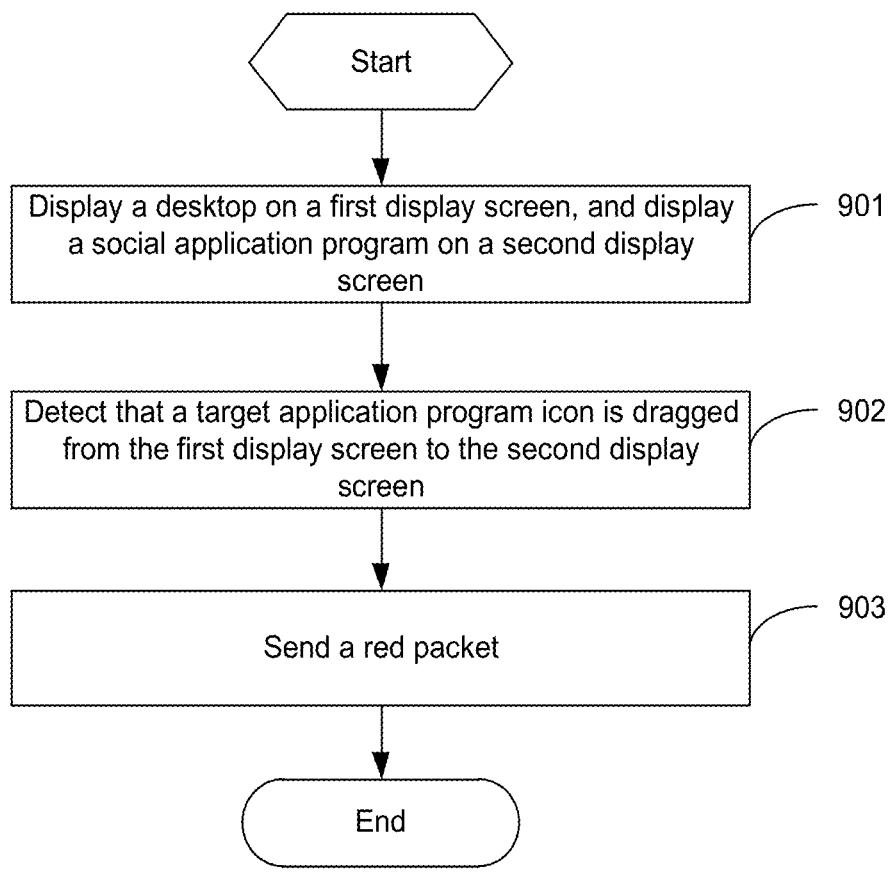
FIG. 9 is a flowchart 6 of an information processing method according to an embodiment of the present disclosure.

As shown in FIG. 9, the information processing method includes the following steps.

Step 901: A terminal device displays a desktop on a first display screen, and displays a social application program on a second display screen.

Step 902: Detect that a user drags a target application program icon from the first display screen to the second display screen.

Figure 10:
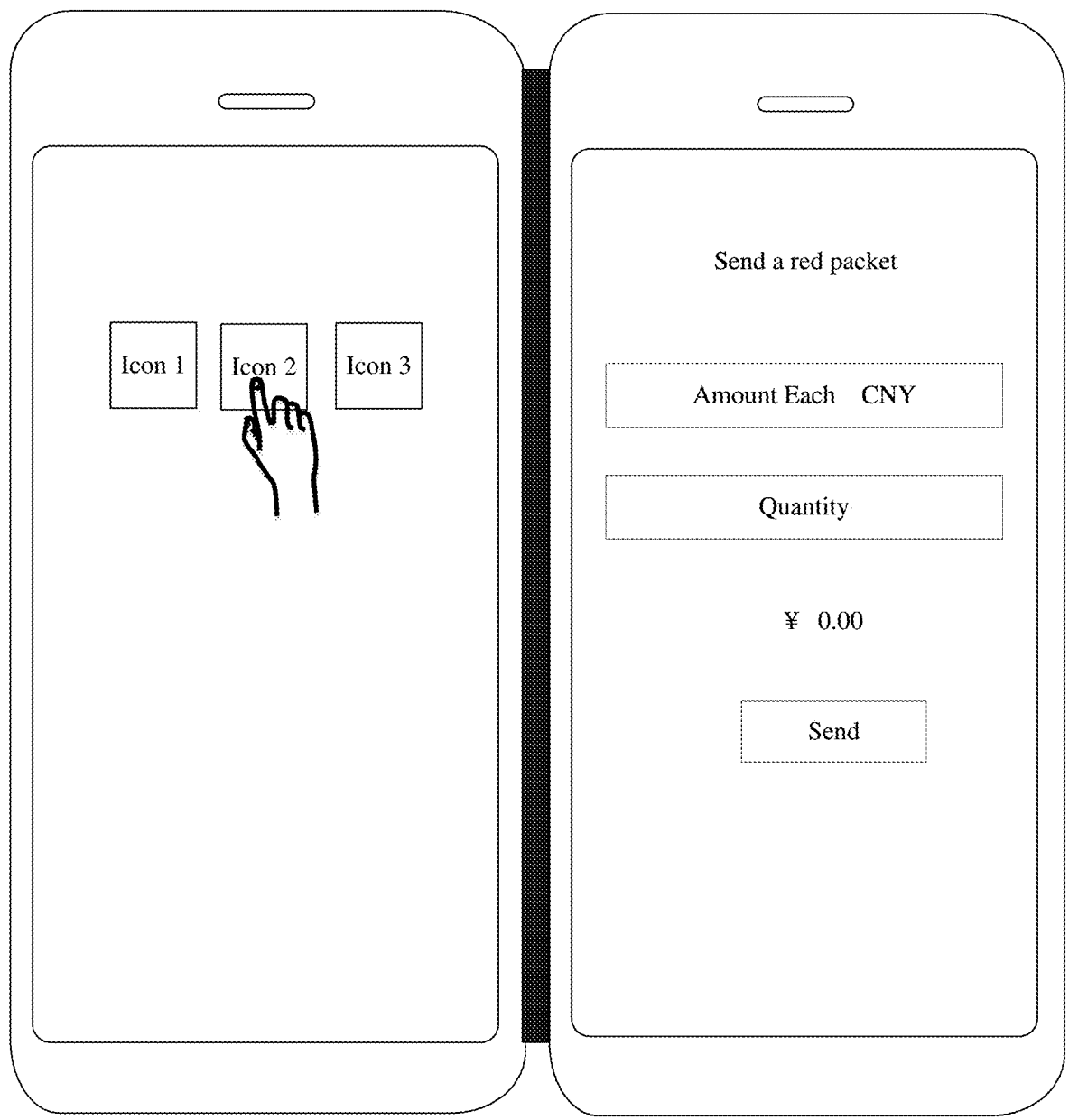
FIG. 10 is a schematic diagram 4 of an interface of a terminal device according to an embodiment of the present disclosure.

The target application program icon may be icon 2 shown in FIG. 10.

Step 903: Send a red packet on the second display screen.

In an interface shown in FIG. 10, a red packet payment interface is displayed on the second display screen.

In this way, a related operation is performed in the first application program based on the type of the second application program, so that user operations can be reduced, and operation efficiency can be improved.

It should be noted that the foregoing enumerated several implementations are merely examples. This embodiment is not limited to the foregoing implementations. Any use scenario in which a quick operation is performed by using association between application programs falls within the foregoing protection scope.

In the information processing method in this embodiment of the present disclosure, an operation corresponding to a function of an application program is performed for multiple scenarios based on the embodiment corresponding to FIG. 1, so that operation convenience is improved.

Figure 11:
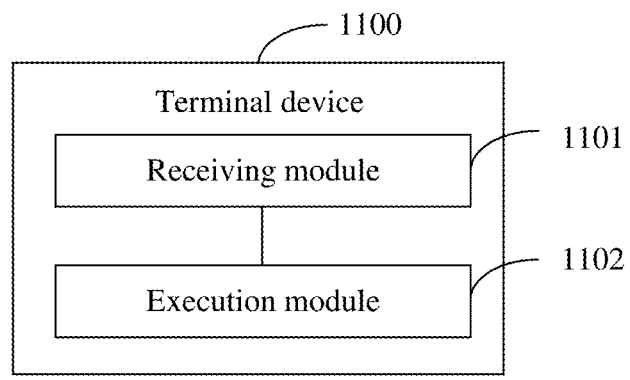
FIG. 11 is a structural diagram 1 of a terminal device according to an embodiment of the present disclosure.

FIG. 11 is a structural diagram of a terminal device according to an embodiment of the present disclosure. As shown in FIG. 11, a terminal device 1100 includes:

a receiving module 1101, configured to: in a case where at least one application program icon is displayed in the first display area, and an interface of a first application program is displayed in the second display area, receive an input by a user for an icon of a second application program, where the at least one application program icon includes the icon of the second application program; and
 an execution module 1102, configured to: in response to the input, perform a target operation in the second display area based on a display feature of the first application program, where the target operation is associated with the second application program.

Optionally, the interface of the first application program includes at least a target control corresponding to a target function, an operation track corresponding to the input includes an operation start point and an operation end point, the operation start point is located in a first preset area in which the icon of the second application program is located, and the operation end point is located in a second preset area in which the target control is located.

The execution module 1102 is configured to perform, in the second display area, a target operation corresponding to the target function.

Optionally, the execution module 1102 is configured to:
in a case where a current interface of the first application program has an information sending function, obtain information associated with the second application program, and send, in the second display area by using the first application program, the information associated with the second application program; or
in a case where a current interface of the first application program has an information update function, obtain update information of the second application program, and update the second application program in the second display area by using the update information; or
in a case where a current interface of the first application program has an information setting function, set the second application program in the second display area.

Figure 12:
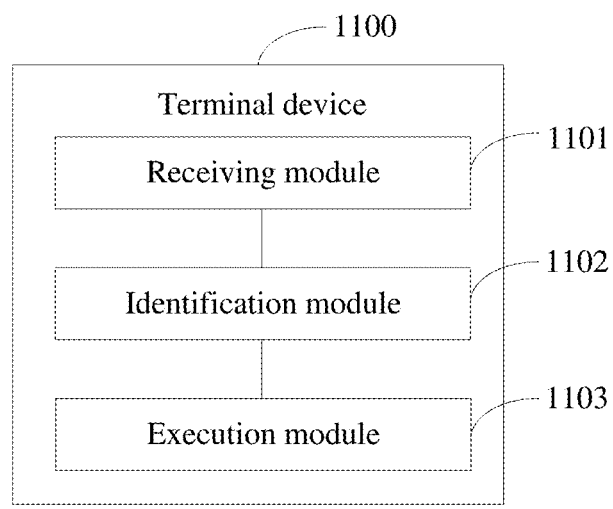
FIG. 12 is a structural diagram 2 of a terminal device according to an embodiment of the present disclosure.

Optionally, as shown in FIG. 12, the terminal device further includes:
an identification module 1103, configured to identify a type of the second application program.

The execution module 1102 is configured to perform a target operation in the second display area based on a display feature of the first application program, where the target operation is associated with the type of the second application program.

Optionally, the second application program is a payment-type application program, and the execution module 1102 is configured to: in a case where a display interface of the first application program is a conversation interface, perform, in the second display area, an operation corresponding to a payment function.

The terminal device 1100 can implement processes implemented by the terminal device in the foregoing method embodiments. To avoid repetition, details are not described herein again.

According to the terminal device 1100 in this embodiment of the present disclosure, the user can perform an operation based on an application program icon and a displayed interface of an application program, so that user operations can be reduced and operation efficiency can be improved.

Figure 13:
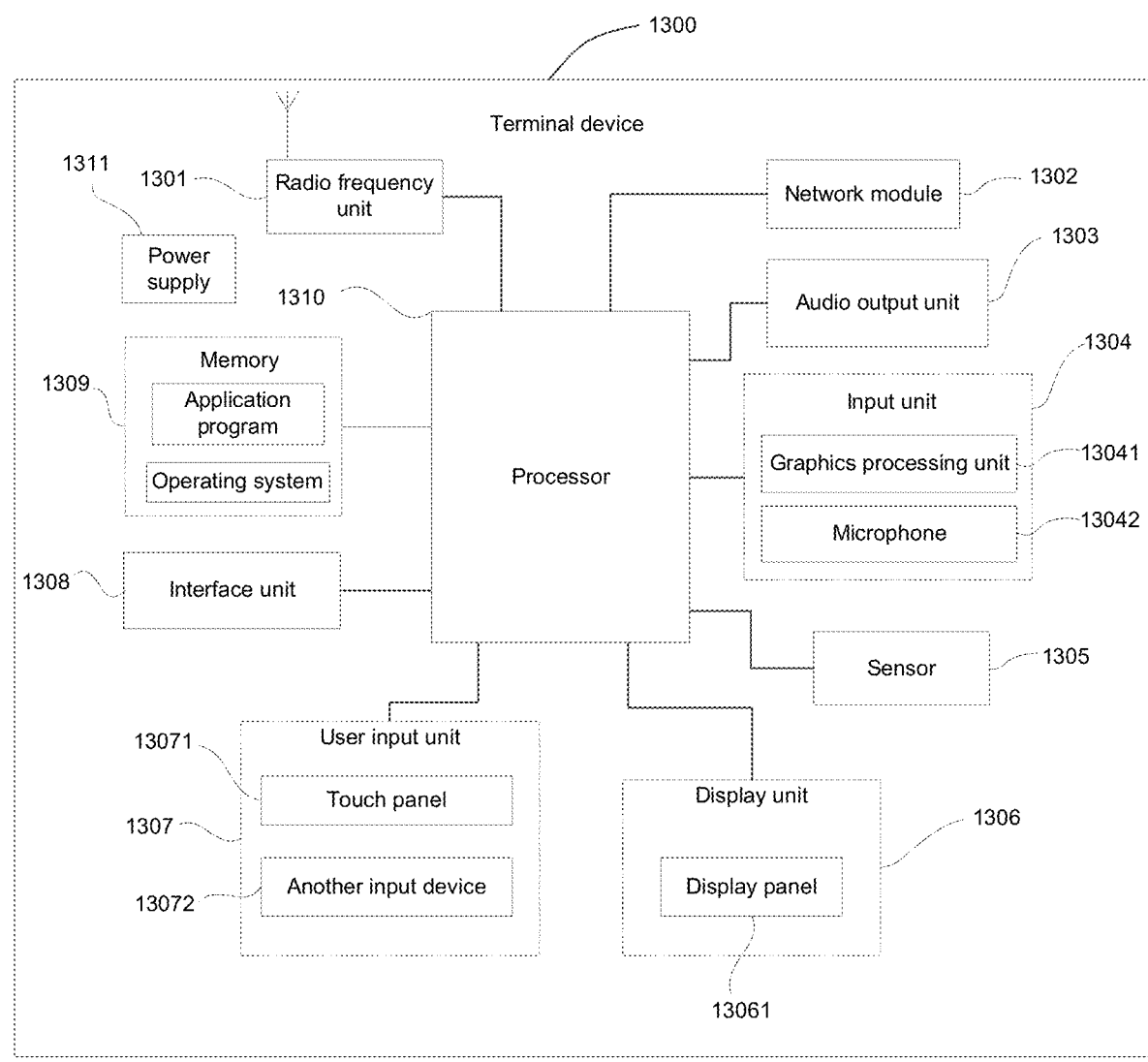
FIG. 13 is a structural diagram 3 of a terminal device according to an embodiment of the present disclosure.

FIG. 13 is a schematic diagram of a hardware structure of a terminal device for implementing the embodiments of the present disclosure. The terminal device 1300 includes but is not limited to components such as a radio frequency unit 1301, a network module 1302, an audio output unit 1303, an input unit 1304, a sensor 1305, a display unit 1306, a user input unit 1307, an interface unit 1308, a memory 1309, a processor 1310, and a power supply 1311. A person skilled in the art may understand that a structure of the terminal device shown in FIG. 13 does not constitute a limitation on the terminal device, and the terminal device may include more or fewer components than those shown in the figure, or combine some components, or have different component arrangements. In this embodiment of the present disclosure, the terminal device includes but is not limited to a mobile phone, a tablet computer, a laptop computer, a palmtop computer, an in-vehicle mobile terminal, a wearable device, a pedometer, and the like.

The user input unit 1307 is configured to: in a case where at least one application program icon is displayed in a first display area, and an interface of a first application program is displayed in a second display area, receive an input by a user for an icon of a second application program, where the at least one application program icon includes the icon of the second application program. The processor 1310 is configured to: in response to the input, perform a target operation in the second display area based on a display feature of the first application program, where the target operation is associated with the second application program.

In this way, the user can perform an operation based on an application program icon and a displayed interface of an application program, so that user operations can be reduced and operation efficiency can be improved.

Optionally, the interface of the first application program includes at least a target control corresponding to a target function, an operation track corresponding to the input includes an operation start point and an operation end point, the operation start point is located in a first preset area in which the icon of the second application program is located, and the operation end point is located in a second preset area in which the target control is located. That the processor 1310 performs the target operation in the second display area based on the display feature of the first application program includes:
performing, in the second display area, a target operation corresponding to the target function.

Optionally, that the processor 1310 performs the target operation in the second display area based on the display feature of the first application program includes:
in a case where a current interface of the first application program has an information sending function, obtaining information associated with the second application program, and sending, in the second display area by using the first application program, the information associated with the second application program; or
in a case where a current interface of the first application program has an information update function, obtaining update information of the second application program, and updating the second application program in the second display area by using the update information; or
in a case where a current interface of the first application program has an information setting function, setting the second application program in the second display area.

Optionally, before performing the target operation in the second display area based on the display feature of the first application program, the processor 1310 is further configured to:
identify a type of the second application program.

That the processor 1310 performs the target operation in the second display area based on the display feature of the first application program includes:
performing the target operation in the second display area based on the display feature of the first application program, where the target operation is associated with the type of the second application program.

Optionally, the second application program is a payment-type application program, and that the processor 1310 performs the target operation in the second display area based on the display feature of the first application program includes:

in a case where a display interface of the first application program is a conversation interface, performing, in the second display area, an operation corresponding to a payment function.

It should be understood that, in this embodiment of the present disclosure, the radio frequency unit 1301 may be configured to receive and send information or receive and send a signal in a call process. For example, after downlink data from a base station is received, the processor 1310 processes the downlink data. In addition, uplink data is sent to the base station. Generally, the radio frequency unit 1301 includes but is not limited to an antenna, at least one amplifier, a transceiver, a coupler, a low noise amplifier, a duplexer, and the like. In addition, the radio frequency unit 1301 may further communicate with a network and another device by using a wireless communication system.

The terminal device provides wireless broadband Internet access for a user by using the network module 1302, for example, helping the user send and receive an email, browse a web page, and access streaming media.

The audio output unit 1303 may convert audio data received by the radio frequency unit 1301 or the network module 1302 or stored in the memory 1309 into an audio signal and output as sound. In addition, the audio output unit 1303 may further provide audio output (for example, call signal receiving sound or message receiving sound) related to a specific function performed by the terminal device 1300. The audio output unit 1303 includes a loudspeaker, a buzzer, a telephone receiver, and the like.

The input unit 1304 is configured to receive an audio or video signal. The input unit 1304 may include a graphics processing unit (GPU) 13041 and a microphone 13042. The graphics processing unit 13041 processes image data of a static picture or a video obtained by an image capture apparatus (such as a camera) in a video capture mode or an image capture mode. A processed image frame may be displayed on the display unit 1306. The image frame processed by the graphics processing unit 13041 may be stored in the memory 1309 (or another storage medium) or sent by using the radio frequency unit 1301 or the network module 1302. The microphone 13042 may receive sound and can process such sound into audio data. The processed audio data may be output by being converted into a format that may be sent to a mobile communications base station by using the radio frequency unit 1301 in a telephone call mode.

The terminal device 1300 further includes at least one sensor 1305, such as an optical sensor, a motion sensor, and another sensor. For example, the optical sensor includes an ambient light sensor and a proximity sensor. The ambient light sensor may adjust luminance of a display panel 13061 based on brightness of ambient light, and the proximity sensor may disable the display panel 13061 and/or backlight when the terminal device 1300 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a terminal device gesture (for example, horizontal and vertical screen switching, a related game, or magnetometer posture calibration), a function related to vibration recognition (for example, a pedometer or a strike), or the like. The sensor 1305 may further include a fingerprint sensor, a pressure sensor, an iris sensor, a molecular sensor, a gyroscope, a barometer, a hygrometer, a thermometer, an infrared sensor, and the like. This is not described herein.

The display unit 1306 is configured to display information entered by the user or information provided for the user. The display unit 1306 may include a display panel 13061, and the display panel 13061 may be configured in a form of a liquid crystal display (LCD), an organic light-emitting diode (OLED), or the like.

The user input unit 1307 may be configured to receive input digit or character information and generate key signal input related to user setting and function control of the terminal device. For example, the user input unit 1307 includes a touch panel 13071 and another input device 13072. The touch panel 13071, also referred to as a touchscreen, may collect a touch operation performed by the user on or near the touch panel 13071 (for example, an operation performed by the user on or near the touch panel 13071 by using any suitable object or accessory such as a finger or a stylus). The touch panel 13071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 1310, and can receive and execute a command sent by the processor 1310. In addition, the touch panel 13071 may be implemented by using a plurality of types such as a resistive type, a capacitive type, an infrared ray, and a surface acoustic wave. The user input unit 1307 may include another input device 13072 in addition to the touch panel 13071. For example, the another input device 13072 may include but is not limited to one or more of a physical keyboard, a function key (such as a volume control key or an on/off key), a trackball, a mouse, a joystick, and the like. Details are not described herein.

Optionally, the touch panel 13071 may cover the display panel 13061. After detecting the touch operation on or near the touch panel 13071, the touch panel 13071 transmits the touch operation to the processor 1310 to determine a type of a touch event, and then the processor 1310 provides corresponding visual output on the display panel 13061 based on the type of the touch event. In FIG. 13, the touch panel 13071 and the display panel 13061 are used as two independent components to implement input and output functions of the terminal device. However, in some embodiments, the touch panel 13071 and the display panel 13061 may be integrated to implement the input and output functions of the terminal device. This is not specifically limited herein.

The interface unit 1308 is an interface connecting an external apparatus to the terminal device 1300. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 1308 may be configured to receive input (for example, data information and power) from the external apparatus and transmit the received input to one or more elements in the terminal device 1300, or may be configured to transmit data between the terminal device 1300 and the external apparatus.

The memory 1309 may be configured to store a software program and various data. The memory 1309 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 1309 may include a high-speed random access memory, and may further include a non-volatile memory such as at least one magnetic disk storage component, a flash memory component, or another volatile solid-state storage component.

The processor 1310 is a control center of the terminal device, and is connected to all parts of the entire terminal device by using various interfaces and lines, and performs various functions of the terminal device and processes data by running or executing the software program and/or the module that are stored in the memory 1309 and invoking the data stored in the memory 1309, to implement overall monitoring on the terminal device. The processor 1310 may include one or more processing units. Optionally, the processor 1310 may be integrated with an application processor and a modem processor. The application processor mainly processes an operating system, a user interface, an application program, and the like, and the modem processor mainly processes wireless communication. It may be understood that the modem processor may alternatively not be integrated into the processor 1310.

The terminal device 1300 may further include the power supply 1311 (such as a battery) that supplies power to each component. Optionally, the power supply 1311 may be logically connected to the processor 1310 by using a power management system, to implement functions such as charging, discharging, and power consumption management by using the power management system.

In addition, the terminal device 1300 includes some function modules not shown, and details are not described herein.

Optionally, an embodiment of the present disclosure further provides a terminal device, including a processor 1310, a memory 1309, and a computer program that is stored in the memory 1309 and executable on the processor 1310. When the computer program is executed by the processor 1310, each process of the embodiment of the foregoing information processing method can be implemented, and a same technical effect can be achieved. To avoid repetition, details are not described herein.

An embodiment of the present disclosure further provides a non-transitory computer readable storage medium. A computer program is stored in the non-transitory computer readable storage medium. When the computer program is executed by a processor, each process of the embodiment of the foregoing information processing method is implemented, and a same technical effect can be achieved. To avoid repetition, details are not described herein. The non-transitory computer readable storage medium includes a read-only memory (ROM), a random access memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal device (which may be a mobile phone, a computer, a server, an air conditioner, or a network device) to execute the methods described in the embodiments of the present disclosure.

The embodiments of the present disclosure are described with reference to the accompanying drawings above. However, the present disclosure is not limited to the foregoing specific implementations. The foregoing specific implementations are merely exemplary, but are not limiting. A person of ordinary skill in the art may make many forms without departing from the objective and the scope of the claims of the present disclosure.

What is claimed is:

1. An information processing method, applied to a terminal device comprising a first display area and a second display area, and comprising:

in a case where at least one application program icon is displayed in the first display area, and an interface of a first application program is displayed in the second display area, receiving an input by a user for an icon of a second application program, wherein the at least one application program icon comprises the icon of the second application program; and in response to the input, performing a target operation for the second application program in the second display area based on a display feature of the first application program, wherein the target operation is associated with the second application program, the target operation is an operation corresponding to the display feature of the first application program, and the display feature comprises display content of the interface or a feature of the interface;

wherein the performing the target operation for the second application program in the second display area based on a display feature of the first application program comprises:

in a case where a current interface of the first application program has an information sending function, obtaining information associated with the second application program, and sending, in the second display area by using the first application program, the information associated with the second application program;

in a case where a current interface of the first application program has an information update function, obtaining update information of the second application program, and updating the second application program in the second display area by using the update information; or in a case where a current interface of the first application program has an information setting function, setting the second application program in the second display area.

2. The method according to claim 1, wherein the interface of the first application program comprises at least a target control corresponding to a target function, an operation track corresponding to the input comprises an operation start point and an operation end point, the operation start point is located in a first preset area in which the icon of the second application program is located, and the operation end point is located in a second preset area in which the target control is located; and the performing a target operation in the second display area based on a display feature of the first application program comprises:

performing, in the second display area, a target operation corresponding to the target function.

3. The method according to claim 1, wherein before the performing a target operation in the second display area based on a display feature of the first application program, the method further comprises:

identifying a type of the second application program; and the performing a target operation in the second display area based on a display feature of the first application program comprises:

performing the target operation in the second display area based on the display feature of the first application program, wherein the target operation is associated with the type of the second application program.

4. The method according to claim 3, wherein in a case where the second application program is a payment-type application program, the performing a target operation in the second display area based on a display feature of the first application program comprises:

in a case where a display interface of the first application program is a conversation interface, performing, in the second display area, an operation corresponding to a payment function.

5. A terminal device, comprising: a memory, a processor, and a computer program that is stored in the memory and executable on the processor, wherein the computer program, when executed by the processor, causes the terminal device to perform:

in a case where at least one application program icon is displayed in a first display area of the terminal device, and an interface of a first application program is displayed in a second display area of the terminal device, receiving an input by a user for an icon of a second application program, wherein the at least one application program icon comprises the icon of the second application program; and in response to the input, performing a target operation for the second application program in the second display area based on a display feature of the first application program, wherein the target operation is associated with the second application program, the target operation is an operation corresponding to the display feature of the first application program, and the display feature comprises display content of the interface or a feature of the interface;

wherein the performing the target operation for the second application program in the second display area based on a display feature of the first application program comprises:

in a case where a current interface of the first application program has an information sending function, obtaining information associated with the second application program, and sending, in the second display area by using the first application program, the information associated with the second application program;

in a case where a current interface of the first application program has an information update function, obtaining update information of the second application program, and updating the second application program in the second display area by using the update information; or in a case where a current interface of the first application program has an information setting function, setting the second application program in the second display area.

6. The terminal device according to claim 5, wherein the interface of the first application program comprises at least a target control corresponding to a target function, an operation track corresponding to the input comprises an operation start point and an operation end point, the operation start point is located in a first preset area in which the icon of the second application program is located, and the operation end point is located in a second preset area in which the target control is located; and the computer program, when executed by the processor, causes the terminal device to perform:

performing, in the second display area, a target operation corresponding to the target function.

7. The terminal device according to claim 5, wherein the computer program, when executed by the processor, causes the terminal device to further perform:

identifying a type of the second application program; and the computer program, when executed by the processor, causes the terminal device to perform:

performing the target operation in the second display area based on the display feature of the first application program, wherein the target operation is associated with the type of the second application program.

8. The terminal device according to claim 7, wherein in a case where the second application program is a payment-type application program;

the computer program, when executed by the processor, causes the terminal device to perform:

in a case where a display interface of the first application program is a conversation interface, performing, in the second display area, an operation corresponding to a payment function.

9. A non-transitory computer-readable storage medium, storing a computer program, wherein the computer program, when executed by a processor, causes the processor to perform:

in a case where at least one application program icon is displayed in a first display area of a terminal device, and an interface of a first application program is displayed in a second display area of the terminal device, receiving an input by a user for an icon of a second application program, wherein the at least one application program icon comprises the icon of the second application program; and in response to the input, performing a target operation for the second application program in the second display area based on a display feature of the first application program, wherein the target operation is associated with the second application program, the target operation is an operation corresponding to the display feature of the first application program, and the display feature comprises display content of the interface or a feature of the interface;

wherein the performing the target operation for the second application program in the second display area based on a display feature of the first application program comprises:

in a case where a current interface of the first application program has an information sending function, obtaining information associated with the second application program, and sending, in the second display area by using the first application program, the information associated with the second application program;

in a case where a current interface of the first application program has an information update function, obtaining update information of the second application program, and updating the second application program in the second display area by using the update information; or in a case where a current interface of the first application program has an information setting function, setting the second application program in the second display area.

10. The non-transitory computer-readable storage medium according to claim 9, wherein the interface of the first application program comprises at least a target control corresponding to a target function, an operation track corresponding to the input comprises an operation start point and an operation end point, the operation start point is located in a first preset area in which the icon of the second application program is located, and the operation end point is located in a second preset area in which the target control is located; and the computer program, when executed by the processor, causes the processor to perform:

performing, in the second display area, a target operation corresponding to the target function.

11. The non-transitory computer-readable storage medium according to claim 9, wherein the computer program, when executed by the processor, causes the processor to further perform:

identifying a type of the second application program; and the computer program, when executed by the processor, causes the processor to perform:

performing the target operation in the second display area based on the display feature of the first application program, wherein the target operation is associated with the type of the second application program.

12. The non-transitory computer-readable storage medium according to claim 11, wherein in a case where the second application program is a payment-type application program, the computer program, when executed by the processor, causes the processor to perform:

in a case where a display interface of the first application program is a conversation interface, performing, in the second display area, an operation corresponding to a payment function.

* * * * *